United States Patent
Nichols (10) Patent No.: US 10,129,203 B2
(45) Date of Patent: *Nov. 13, 2018

(54) NETWORK CLIENT ID FROM EXTERNAL MANAGMENT HOST VIA MANAGEMENT NETWORK

(71) Applicant: International Business Machines Corporation, Armonk, NY (US)

(72) Inventor: Roger W Nichols, Marlborough, MA (US)

(73) Assignee: International Business Machines Corporation, Armonk, NY (US)

(*) Notice: Subject to any disclaimer, the term of this patent is extended or adjusted under 35 U.S.C. 154(b) by 401 days.

This patent is subject to a terminal disclaimer.

(21) Appl. No.: 14/795,672

(22) Filed: Jul. 9, 2015

(65) Prior Publication Data

US 2017/0012931 A1  Jan. 12, 2017

(51) Int. Cl.
| | | |
|---|---|---|
| G06F 15/16 | (2006.01) | |
| H04L 29/12 | (2006.01) | |
| H04L 29/08 | (2006.01) | |
| H04L 29/06 | (2006.01) | |

(52) U.S. Cl.
CPC ........ H04L 61/2015 (2013.01); H04L 61/609 (2013.01); H04L 67/12 (2013.01); H04L 67/18 (2013.01); H04L 67/42 (2013.01); H04L 69/18 (2013.01)

(58) Field of Classification Search
CPC ... H04L 61/2015; H04L 61/609; H04L 67/18; H04L 41/12
See application file for complete search history.

(56) References Cited

U.S. PATENT DOCUMENTS

| | | | |
|---|---|---|---|
| 7,590,737 B1* | 9/2009 | Chen | G06F 11/004 709/223 |
| 8,779,922 B2 | 7/2014 | Groth et al. | |
| 8,850,238 B2 | 9/2014 | Wang | |
| 2005/0125575 A1* | 6/2005 | Alappat | H04L 29/1232 710/41 |
| 2005/0262218 A1* | 11/2005 | Cox | H04L 61/2015 709/217 |

(Continued)

OTHER PUBLICATIONS

Intelligent Platform Management Interface Specification Second Generation v2.0. Intel, Oct. 1, 2013, www.intel.com/content/dam/www/public/us/en/documents/product-briefs/ipmi-second-gen-interface-spec-v2-rev1-1.pdf. Accessed Online Mar. 30, 2018.*

*Primary Examiner* — Brian J. Gillis
*Assistant Examiner* — Austin J Moreau
(74) *Attorney, Agent, or Firm* — Derek S. Jennings; Patent Mining Works, LLC (57) ABSTRACT

A method includes a management host server causing a power distribution unit to apply standby power to at least one server management module having at least one service processor; the management host server receiving an IP address request from the at least one server management module; the management host server network assigning the IP address and associates the at least one server management module with the assigned IP address; and the management host server issuing a command to the at least one server management module to store a client ID as a location sensor value wherein a geographic map can be created using the client ID.

13 Claims, 6 Drawing Sheets

(56) References Cited

U.S. PATENT DOCUMENTS

| | | | |
|---|---|---|---|
| 2006/0044117 A1* | 3/2006 | Farkas | H05K 7/1498 |
| | | | 713/340 |
| 2007/0250603 A1 | 10/2007 | Suen | |
| 2008/0256370 A1* | 10/2008 | Campbell | G06F 11/0709 |
| | | | 713/300 |
| 2010/0095138 A1* | 4/2010 | Huang | G06F 1/24 |
| | | | 713/300 |
| 2014/0006671 A1 | 1/2014 | Das et al. | |
| 2014/0015857 A1 | 1/2014 | Smith et al. | |
| 2015/0142960 A1* | 5/2015 | Uchiyama | H04L 61/2015 |
| | | | 709/224 |
| 2015/0304233 A1* | 10/2015 | Krishnamurthy | H04L 47/762 |
| | | | 709/226 |
| 2016/0072761 A1* | 3/2016 | Shih | H04L 61/2015 |
| | | | 709/220 |
| 2017/0031620 A1* | 2/2017 | Yu | G06F 3/0625 |

* cited by examiner

NETWORK CLIENT ID FROM EXTERNAL MANAGMENT HOST VIA MANAGEMENT NETWORK

BACKGROUND

The present invention relates to providing a geographic client identifier, and more specifically, to using client ID and power applications to provide a geographic map of clients within a data center environment. Generally, this invention relates to data center management. Data centers typically contain racks of computer equipment such as servers. Many networking and management tasks in a data center require equipment to identify itself, and if no locally available identifying information is available then the equipment cannot identify itself. This invention provides for a management server host to generate geographic client identifiers and store those identifiers in the client's management module, thereby allowing a host processor OS to retrieve the client identifier from the management module. The management host server may generate client's identifiers using multiple methods. One embodiment is through the use of power distribution units.

SUMMARY

According to one aspect of the present invention, a method includes a management host server causing a power distribution unit to apply standby power to at least one server management module having at least one service processor; the management host server receiving an IP address request from the at least one server management module; the management host server assigning the IP address and associates the at least one server management module with the assigned IP address; and the management host server issuing a command to the at least one server management module to store a client ID as a location sensor value wherein a geographic map can be created using the client ID.

According to another aspect of the present invention, a system includes one or more servers with one or more processors, one or more computer-readable memories, one or more server management subsystems and one or more computer-readable, tangible storage devices; a management network operatively coupled to at least one of the one or more servers for execution by at least one management processor; a remote power controller operatively coupled to at least one of the one or more servers via a power distribution unit; the management network operatively coupled to the remote power controller, configured to cause the power distribution unit to apply standby power to at least one server management module having at least one service processor; the management network operatively coupled to at least one management host server for execution by at least one of the one or more processors via at least one of the one or more memories, configured to receive an IP address request from at least one server management module; the at least one management host server operatively coupled to at least one of the one or more servers for execution by at least one of the one or more processors via at least one of the one or more memories, configured to assign the IP address and associates the at least one server management module with the assigned IP address; and the at least one management host server operatively coupled to at least one of the one or more servers for execution by at least one of the one or more processors via at least one of the one or more memories, configured to issue a command to the at least one server management module to store a client ID as a location sensor value wherein a geographic map can be created using the client ID.

According to yet another aspect of the present invention, a computer includes one or more computer-readable, tangible storage medium; program instructions, stored on at least one of the one or more storage medium, cause a power distribution unit to apply standby power to at least one server management module having at least one service processor; program instructions, stored on at least one of the one or more storage medium, to cause a management host server network to receive an IP address request from the at least one server management module; program instructions, stored on at least one of the one or more storage medium, to cause the management host server to assign the IP address and associates the at least one server management module with the assigned IP address; and program instructions, stored on at least one of the one or more storage medium, to cause the management host server to issue a command to the at least one server management module to store a client ID as a location sensor value wherein a geographic map can be created using the client ID.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Figure 1A:
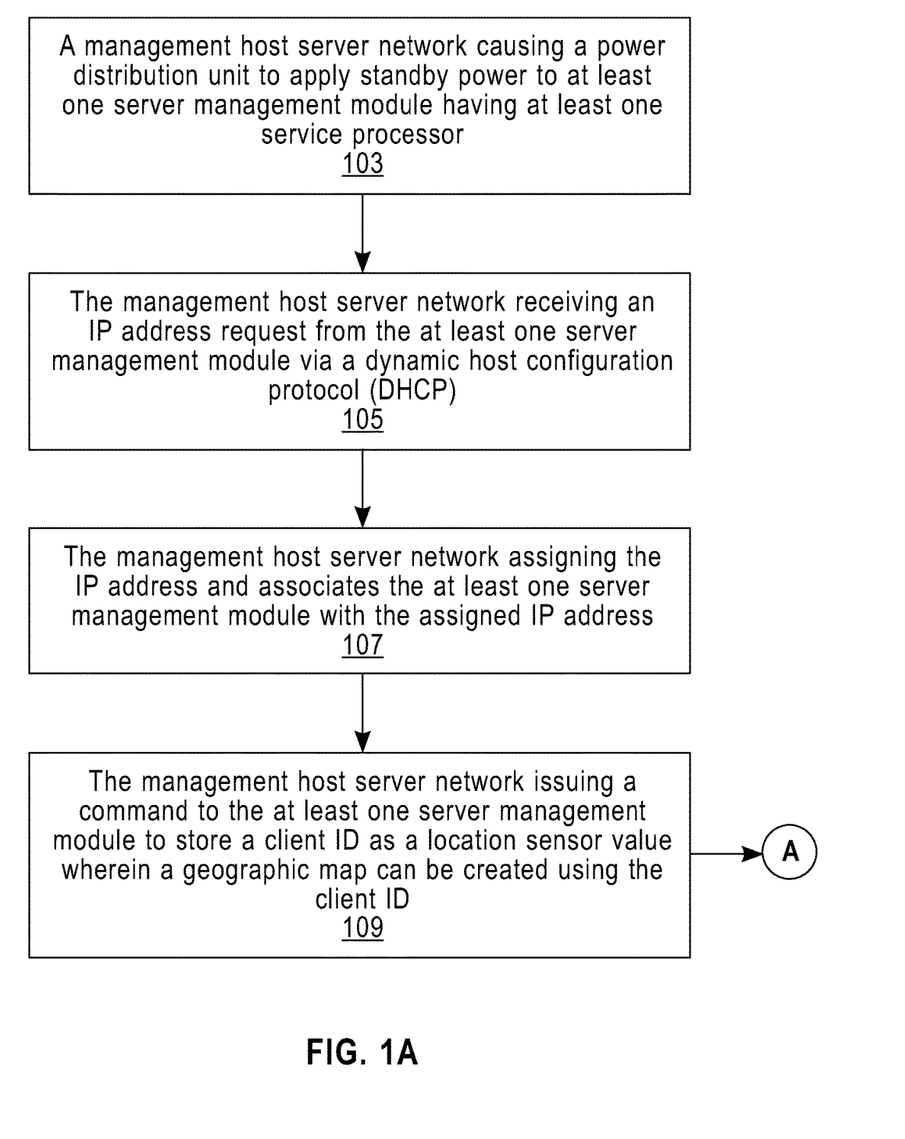
FIGS. 1A and 1B show a flowchart according to an embodiment of the present invention.
Figure 1B:
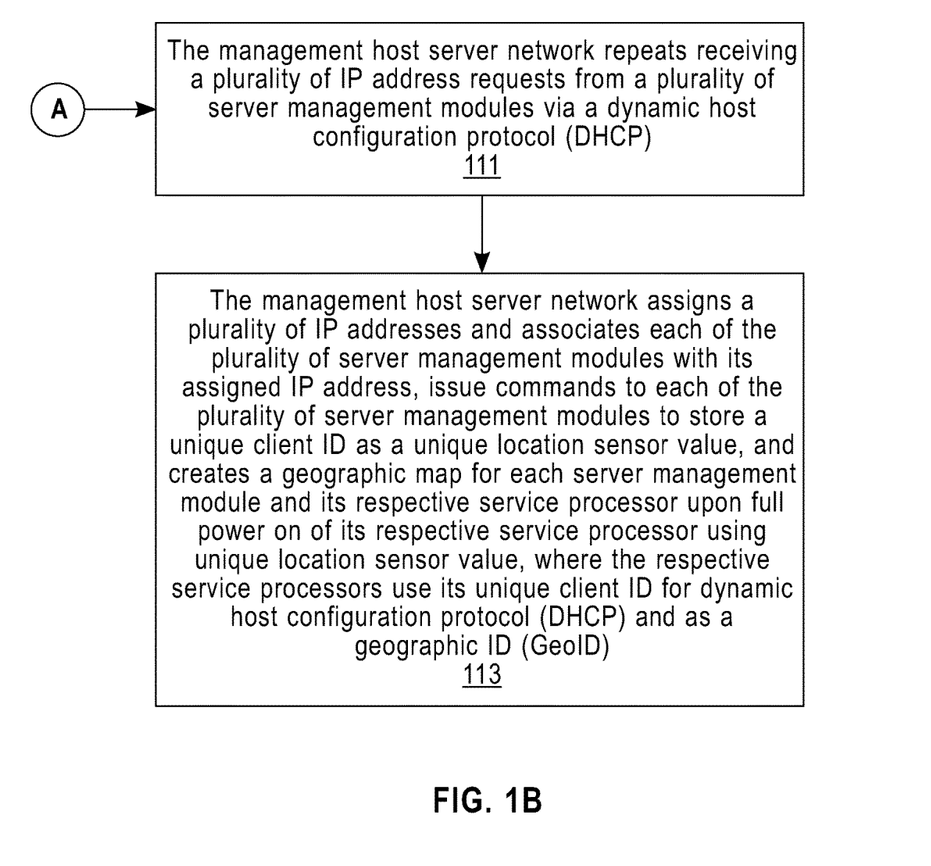

Now referring to FIGS. 1A and 1B, shown is a process according to an embodiment of the present invention. The process starts by having a management host server causing a power distribution unit to apply standby low power to at least one server management module having at least one service processor (103). The management host server receiving an IP address request from the at least one server management module via a dynamic host configuration protocol, DHCP (105). The management host server then assigns the IP address and associates the at least one server management module with the assigned IP address (107). The management host server issuing a command to the at least one server management module to store a client ID as a location sensor value wherein a geographic map can be created using the client ID (109).

Still referring to FIGS. 1A and 1B, the process continues by having the management host server repeating the process by receiving a plurality of IP address requests from a plurality of server management modules via dynamic host configuration protocol, DHCP (111). The process concludes by having the management host server assign a plurality of IP addresses and associates each of the plurality of server management modules with its assigned IP address, issue commands to each of the plurality of server management modules to store a unique client ID as a unique location sensor value, and creates a geographic map for each server management module and its respective host processor upon full power on of its respective host processor using the unique location sensor value, where the respective host processors use its unique client ID for dynamic host configuration protocol (DHCP) and as a geographic ID (GeoID), (113).

Figure 1C:
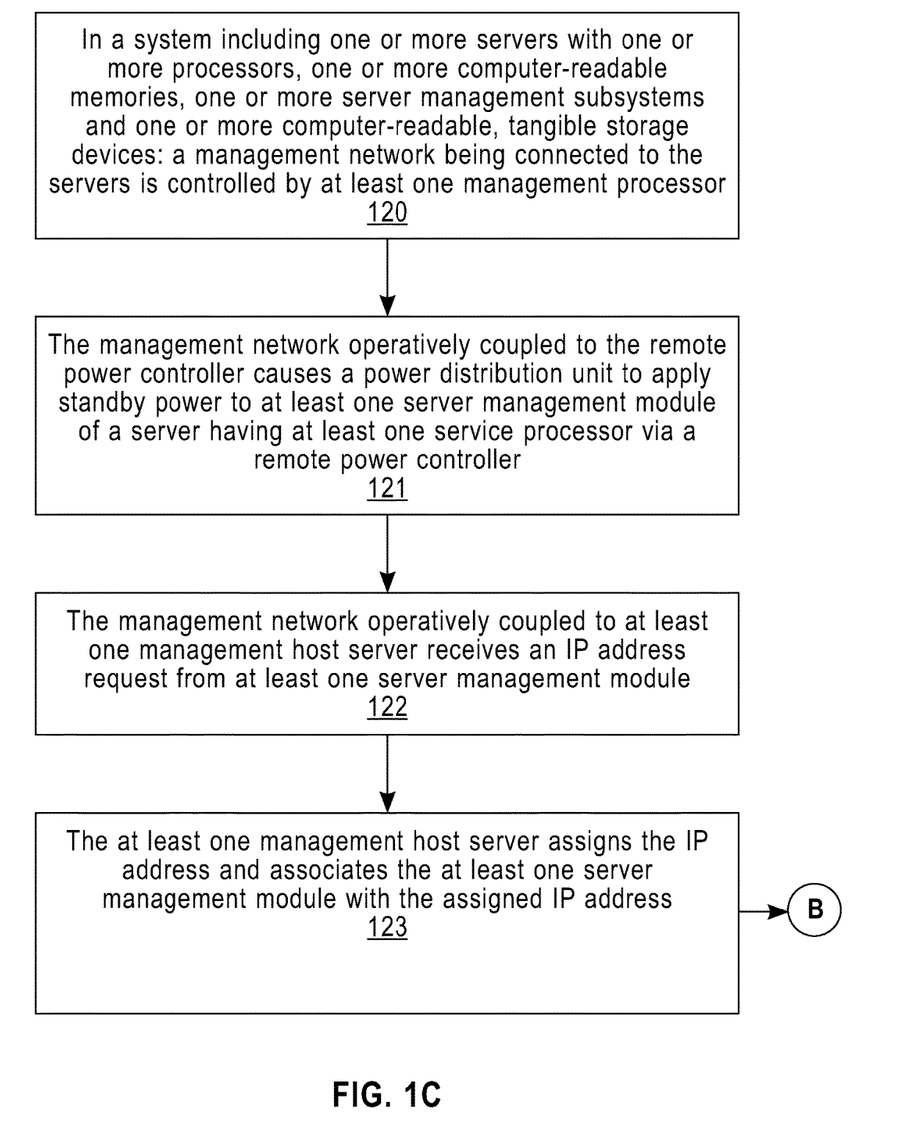
FIGS. 1C and 1D show another flowchart according to an embodiment of the present invention.
Figure 1D:
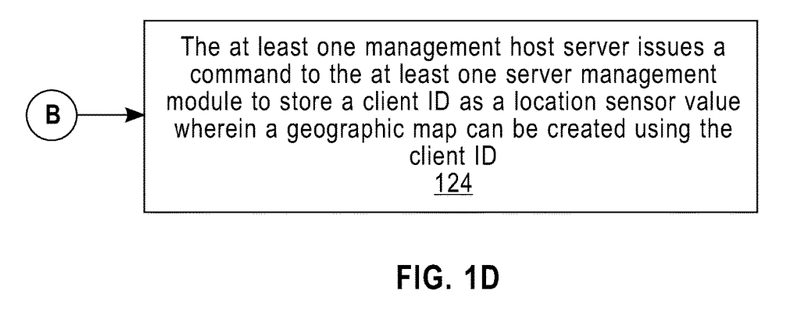

Now referring to FIGS. 1C and 1D, shown is another process according to an embodiment of the present invention. The process starts by having a system including one or more servers with one or more processors, one or more computer-readable memories, one or more server management subsystems and one or more computer-readable, tangible storage devices: a management network being connected to the servers is controlled by at least one management processor (120) operatively coupled to the remote power controller causes a power distribution unit to apply standby low power to at least one server management module of a server having at least one service processor via a remote power controller (121). The process then has the management network which is operatively coupled to at least one management host server receive an IP address request from at least one server management module (122). The at least one management host server then assigns the IP address and associates the at least one server management module with the assigned IP address (123). The at least one management host server then issues a command to the at least one server management module to store a client ID as a location sensor value wherein a geographic map can be created using the client ID.

Figure 2:
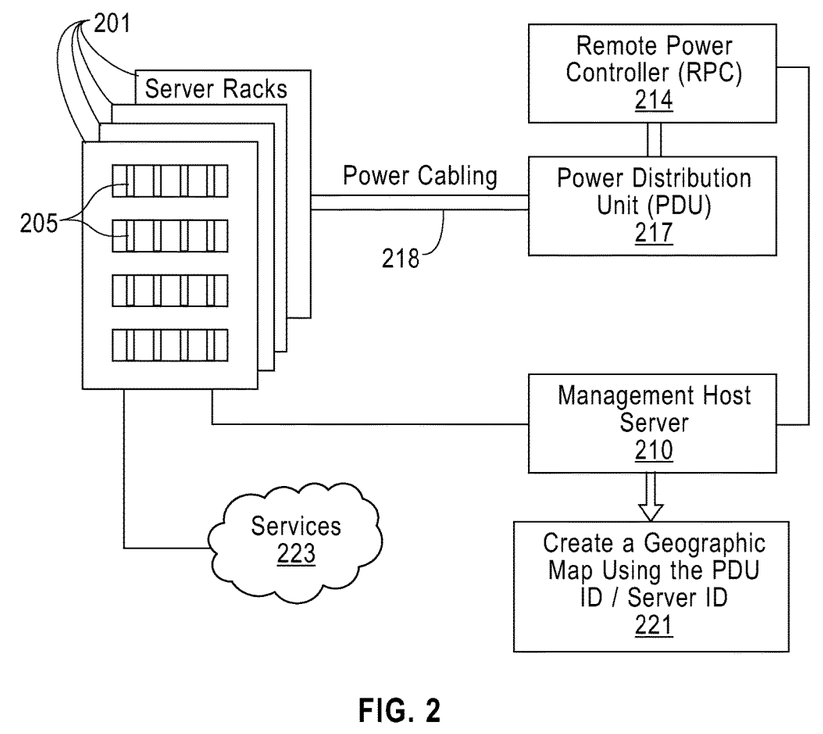
FIG. 2 shows an exemplary implementation according to an embodiment of the present invention.

Referring to FIG. 2, an exemplary implementation according to an embodiment of the present invention is depicted. A plurality of server racks 201, within a typical data center, includes servers 205 having a server management module having at least one server processor. The server racks 201 and the servers 205 are under management control by a management host server 210. The management host server 210 is connected to a remote power control controller 214 that controls a power distribution unit (PDU) 217. The PDU 217 supplies power via power cabling 218 to the server racks 201 and the server blades 205. The PDU 217 supplies both standby low and full power to the server blades. As noted with the process according to an embodiment of the invention, when a server management module requests an IP address it uses a management network. As a results of the assigning of the requested IP address the management host server 210 generates a client ID which is a location senor value. The location sensor value is used as the client ID for DHCP upon power boot-up by the host processor in servers 205. The management host server 210 is then able to create a geographic map using the PDU ID/client ID 221 which was relayed back to the server blade 205 and is available to external technicians to determine the location of the server blade 205. Further, as part of the full boot up of the sever blades 205, various other network services 223 such as simple network management protocol (SNMP) can be conducted using the client ID.

Figure 3:
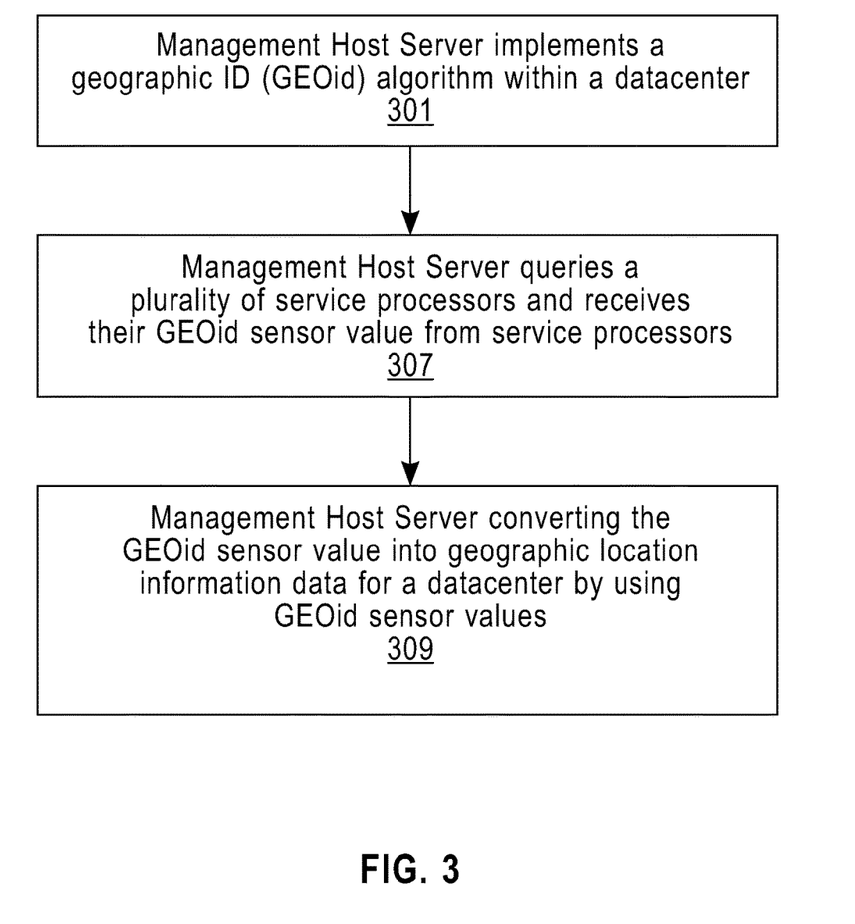
FIG. 3 shows still another flowchart according to an embodiment of the present invention.

Referring to FIG. 3, shown is another process according to yet another embodiment of the present invention. The process has a management host server system implementing a geographic ID (GEOid) algorithm within a data center environment (301). The management host server system queries a plurality of service processors and receives their GEOid sensor values from the service processors (307). The management host server system converts the GEOid sensor values into geographic location information data for a data center by using GEOid and power assignment creating client ID and assigned IP address. (309). This process requires the coordination of the management host server system, power distribution unit, service processor and a host processor from the application of standby low power to full power boot up. The management host server system is able to write to the server's management processor the GEOid/sensor value prior to full power boot-up.

Still referring to FIGS. 2 and 3, the GEOid algorithm is the process the host O/S uses to convert the GEOid sensor value to a geographic location. An example algorithm is divide the value by N, where N is the number of hosts in a rack. The rack number is 1+quotient, the host number within the rack is 1+the remainder. (IE 8 nodes per rack, GEOId sensor value is 22, 22/8=2, remainder of 6, yielding 3rd rack, 7th host.) The DHCP Client Id being sent into the application network is the first example of what the host might do with the GEOid sensor value—use it as the DHCP Client Id. A data center designer may want to know which host is requesting a DHCP address to provide different options (IP address, hostname, router, gateway, etc) back to the host. A simple network management protocol (SNMP) syslocation response, sent into an application network is another example of what a host might do with the GEOid sensor value. The SNMP syslocation is a value typically set by an administrator to identify where in physical space a host is located. Using the results of the GeoId sensor value to automatically apply updates to this value would be helpful.

Figure 4:
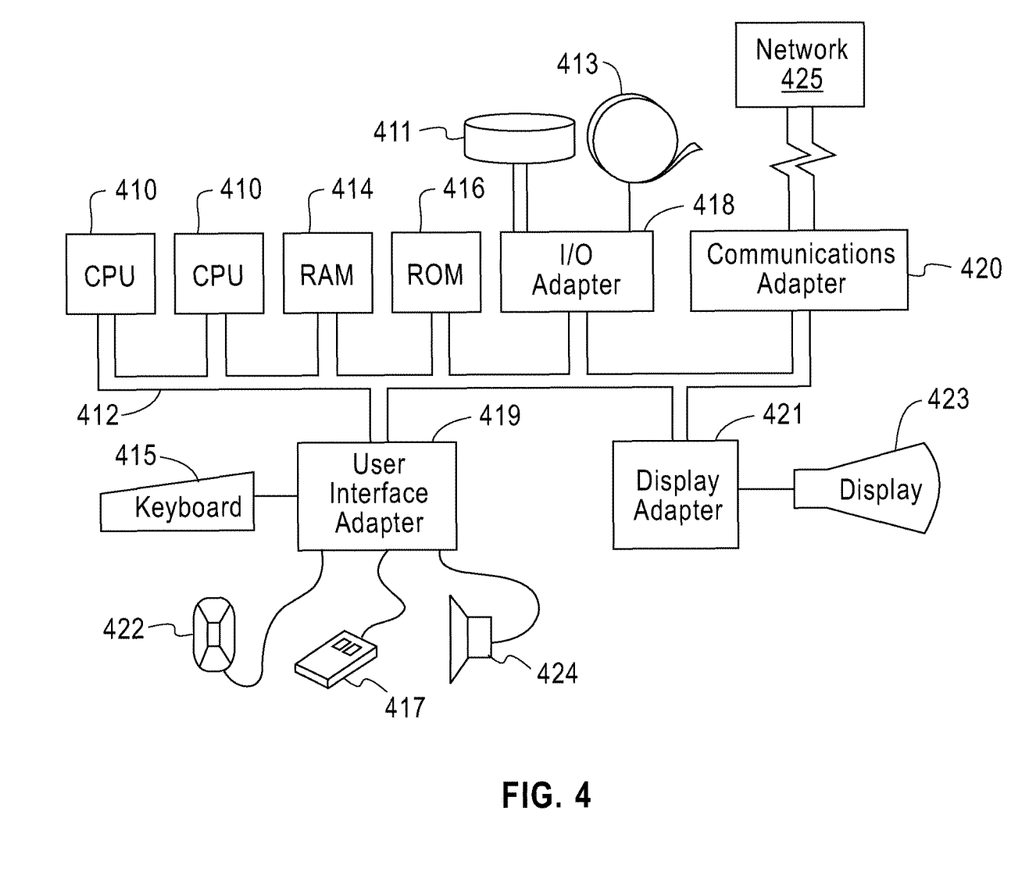
FIG. 4 illustrates a hardware configuration according to an embodiment of the present invention.

Referring now to FIG. 4, this schematic drawing illustrates a hardware configuration of an information handling/computer imaging system in accordance with the embodiments of the invention. The system comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of the embodiments of the invention. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The invention solves the problem of providing a geographic client identifier to a chassis which does not have geographic (or slot) identification pins on its back plane. This problem is present when using rack based chassis as field replaceable units in large systems made up of many such servers. Rather than use locally available information, a management host server can provide the information to the chassis' management module, which in turn is provided to the host processor via standard intelligent platform management interface (IPMI) command structure. Given the absence of geographic location identifier pins in a rack server, embodiments of the present invention was devised to identify servers by geographic location. The management server station can provide an identifier to the server's management module, which stores it as the value of the location sensor. The server's host processor operating system can then query the management module location sensor to retrieve a client identifier useful in many networking and self-identification tasks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
one or more servers with one or more processors, one or more computer-readable memories, one or more server management subsystems and one or more computer-readable, tangible storage devices;
a management network operatively coupled to at least one of the one or more servers;
a remote power controller operatively coupled to at least one of the one or more servers via a power distribution unit;
the management network operatively coupled to the remote power controller, configured to cause the power distribution unit to apply standby low power to at least one server management module having at least one service processor;
the management network operatively coupled to at least one management host server and configured to receive an IP address request from at least one server management module;
the at least one management host server operatively coupled to at least one of the one or more servers and configured to assign the IP address and associates the at least one server management module with the assigned IP address; and
the at least one management host server operatively coupled to at least one of the one or more servers and configured to issue a command to the at least one server management module to store a client ID as a location sensor value prior to full power boot-up, wherein a geographic map is created using the client ID upon full power boot-up.

2. The system according to claim 1, wherein the IP address requested by the at least one server management module is done via a dynamic host configuration protocol (DHCP).

3. The system according to claim 1, further comprising the management host server operatively coupled to at least one of the one or more servers and configured to receive a plurality of IP address requests from a plurality of server management modules.

4. The system according to claim 3, further comprising the management host server operatively coupled to at least one of the one or more servers and configured to assign a plurality of IP addresses and associates each of the plurality of server management modules with the assigned IP address.

5. The system according to claim 4, further comprising the management host server operatively coupled to at least one of the one or more servers and configured to issue commands to each of the plurality of server management modules to store a unique client ID as a unique location sensor value.

6. The system according to claim 5, further comprising the management host server operatively coupled to at least one of the one or more servers and configured to create a geographic map for each server management module and the respective service processor upon full power on of the respective host processor.

7. The system according to claim 6, wherein the respective host processor retrieves the unique client ID from the management processor for network services and self identification.

8. A computer program product comprising:
one or more computer-readable, tangible storage medium;
program instructions, stored on at least one of the one or more storage medium, cause a power distribution unit to apply standby low power to at least one server management module having at least one service processor;
program instructions, stored on at least one of the one or more storage medium, to cause a management host server network to receive an IP address request from the at least one server management module;
program instructions, stored on at least one of the one or more storage medium, to cause the management host server to assign the IP address and associates the at least one server management module with the assigned IP address; and
program instructions, stored on at least one of the one or more storage medium, to cause the management host server to issue a command to the at least one server management module to store a client ID as a location sensor value prior to full power boot-up, wherein a geographic map is created using the client ID upon full power boot-up.

9. The computer program product according to claim 8, further comprising program instructions, stored on at least one of the one or more storage medium, to cause the management host server to receive a plurality of IP address requests from a plurality of server management modules.

10. The computer program product according to claim 9, further comprising program instructions, stored on at least one of the one or more storage medium, to cause the management host server to assign a plurality of IP addresses and associates each of the plurality of server management modules with the assigned IP address.

11. The computer program product according to claim 10, further comprising program instructions, stored on at least one of the one or more storage medium, to cause the management host server to issue commands to each of the plurality of server management modules to store a unique client ID as a unique location sensor value.

12. The computer program product according to claim 11, further comprising program instructions, stored on at least one of the one or more storage medium, to cause the management host server to issue commands to each of the plurality of server management modules to create a geographic map for each server management module and the respective host processor upon full power on of the respective host processor.

13. The computer program product according to claim 9, wherein the respective host processor uses the unique client ID for self identification and network services including dynamic host configuration protocol (DHCP).

* * * * *